Patented Sept. 19, 1939

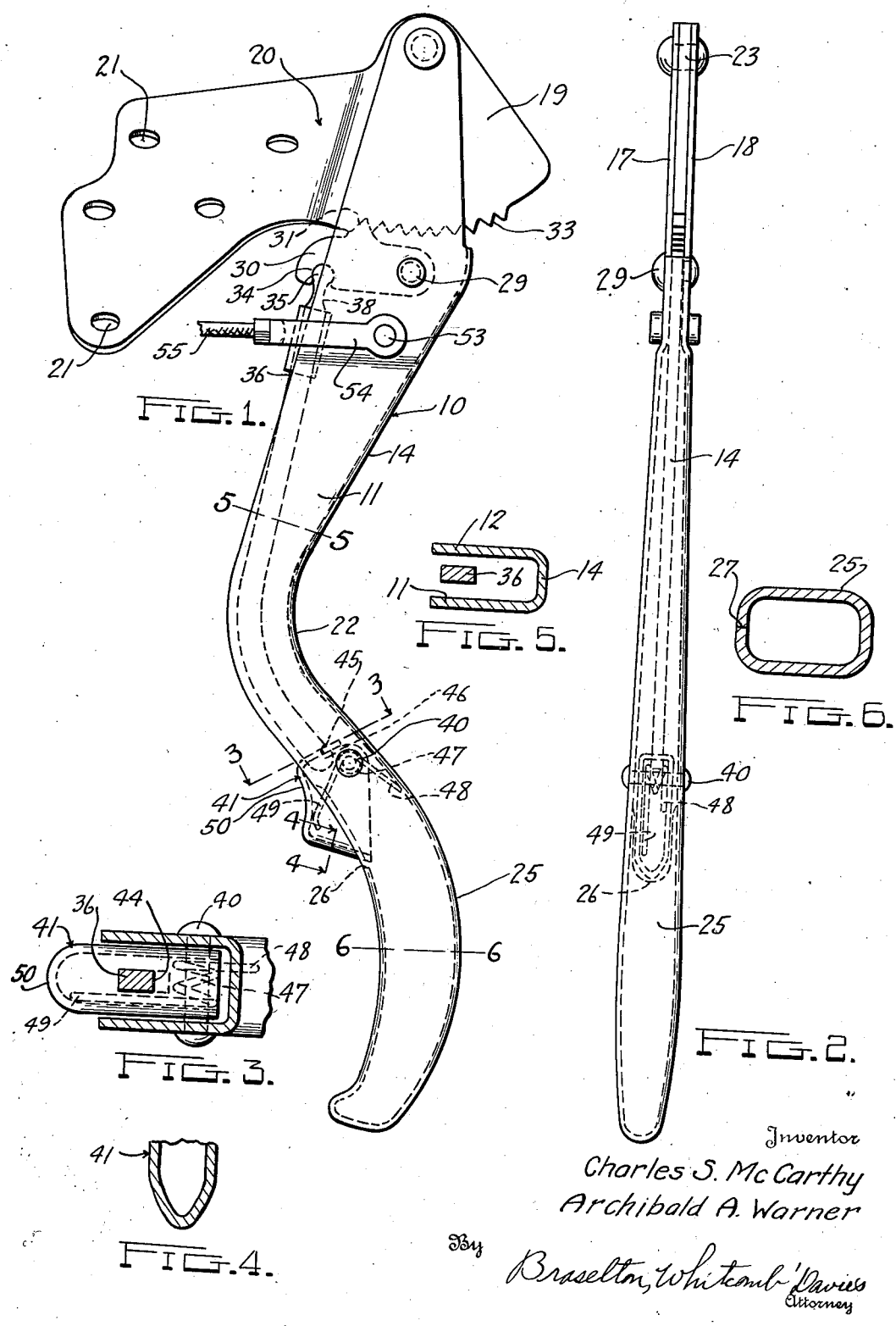

2,173,322

UNITED STATES PATENT OFFICE 2,173,322

MECHANISM CONTROL

Charles S. McCarthy, Toledo, Ohio, and Archibald A. Warner, Detroit, Mich., assignors to The Logan Gear Company, Toledo, Ohio, a corporation of Ohio Application June 28, 1938, Serial No. 216,314

7 Claims. (Cl. 74—537)

This invention relates to mechanism control, and more especially to lever mechanism for controlling the brakes of an automotive vehicle or the like.

The invention more particularly relates to a lever and clutch arrangement for adjusting the emergency brakes of an automotive vehicle to "set" position, the arrangement being of a character adapted for positioning adjacent the instrument panel of a vehicle for convenience of operation by the vehicle operator.

The invention contemplates the provision of a clutch mechanism for holding the lever mechanism in brake setting position, in combination with simple and inexpensive yet effective and positive means for releasing the clutch mechanism.

A further object of the invention is the provision of a lever mechanism wherein the lever element may be fabricated of sheet metal and the clutch mechanism associated with the lever manipulated by trigger means so arranged as to be conveniently manipulated by the vehicle operator without danger of the flesh of the operator's hand being pinched or lacerated by the trigger arrangement.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view of a lever arrangement of our invention;

Figure 2 is a front elevational view of the arrangement shown in Figure 1;

Figure 3 is an enlarged transverse sectional view taken substantially on the line 3—3 of Figure 1;

Figure 4 is an enlarged fragmentary section taken substantially on the line 4—4 of Figure 1;

Figure 5 is an enlarged sectional view taken on the line 5—5 of Figure 1;

Figure 6 is an enlarged sectional view taken on the line 6—6 of Figure 1.

While we have shown the arrangement of our invention as particularly adaptable for controlling the emergency brakes of an automotive vehicle, it is to be understood that we contemplate the utilization of the arrangement of our invention with any mechanism wherever the same may be found to have utility.

Referring to the drawing in detail, we have illustrated a lever or lever member 10 of the second order of levers which is preferably fabricated of sheet metal and being formed throughout a major portion of its length into a U-shaped or hollow configuration as illustrated in Figure 5, the lever body portion having side walls 11 and 12 integrally joined by bight portion 14. The upper part of the lever structure terminates in a pair of spaced parallel portions 17 and 18 which straddle a uniplanar portion 19 of a support or supporting bracket 20, the latter being adapted to be secured to the dash or dash frame portion (not shown) of an automotive vehicle by means of rivets or other securing means passing through openings 21 in the supporting member. The upper extremities of the projections 17 and 18 of the lever member are provided with aligned openings through which pass a rivet or suitable shaft 23 which also passes through an opening in the support 20 so as to pivotally connect the lever member to the support. The lever member is preferably formed into curved configuration as at 22 to accommodate the instrument panel when the lever is moved to brake setting position.

The lower portion of the lever member 10 is formed with a hollow hand grip portion 25 of a sectional configuration as illustrated in Figure 6. It is to be noted that the metal is folded to substantially rectangular configuration to form the handle portion and the edge portions abutting forming a seam 27 as shown in Figure 6. It has been found that the inherent stress of the formed metal is sufficient to cause the abutting edges to be held closely together as at 27 but the edges may be welded together if so desired.

The side wall portions 17 and 18 of the lever are formed with aligned openings to receive a suitable shaft or pin 29 and pivoted upon the shaft 29 intermediate the lever side wall portions is a pawl member or clutch 30 having a projecting tooth 31 which is adapted for cooperation with a serrated portion 33 preferably formed on a depending edge of uniplanar portion 19 of the support 20. The pawl or clutch member 30 is provided with a circular recess 34 to receive a circular disk like portion 35 formed on the upper extremity of a rod or bar 36, the recess in the pawl having a restricted throat as shown at 38 which retains the circular portion 35 of the rod in the recess.

Adjacent the upper part of the grip portion 55

25 of the lever is a transversely extending pin or shaft 40 which is held in place by means of enlarged or swaged head portions and upon which is pivotally supported a finger piece or trigger 41 which is formed of sheet metal into hollow or cup-like configuration, the pin 40 passing through aligned openings in the side walls of the trigger. An upper wall portion of the trigger is provided with a slot 44 and the lower extremity of the clutch or pawl operating rod 36 is provided with a notch 45 to form a hook-like portion or extremity 46 on the rod. During assembly of the trigger and the rod 36, the rod is hooked into the slot in the trigger so that the parts in assembled relation are arranged as shown in Figures 1 and 3.

We have provided spring means in the form of a coil 47 surrounding the pin 40, one end of the spring 48 being in engagement with the interior front wall of the grip portion 25, while the other extremity of the spring 49 engages an interior wall of the trigger to at all times urge the trigger and operating rod into the position shown in Figure 1 and also urge the pawl or clutch 30 into engagement with the clutch surface 33. Thus, a single spring means in our invention serves to urge the relatively movable elements at all times toward a predetermined position, and with such spring pressure on such elements the tendency of vibration of the parts is reduced to a minimum.

It is to be noted that the trigger is positioned in an open rear portion of the lever grip, the metal of the grip terminating as at 26 so as to accommodate pivotal movement of the trigger to the interior of the lever grip. As particularly shown in Figure 4 the lower portion of the trigger is formed into a converging configuration. While releasing the clutch a finger of the operator's hand rests upon the rear wall 50 of the trigger, but other fingers of the hand may be in contact with a portion of the trigger which is moving into the grip portion of the lever during the clutch releasing operation. With the configuration of the lower portion of the trigger fashioned as shown in Figure 4, there is no tendency for the inward movement of the trigger to pinch or lacerate flesh portions which may be in contact therewith.

In order to effect a dampening, the vibration of bar 36 which may arise as a sympathetic movement caused from engine vibrations of the vehicle, it is desirable to place a small portion of non-metallic material preferably in the form of a bushing 52 to accomplish this purpose. We have found that a short length of rubber tubing serves this purpose very effectively. It is also to be noted that in the lever arrangement of our invention the bight or closed portion 14 is formed upon the front of the lever to enhance the appearance of that portion of the structure which may be in the line of vision of the vehicle operator.

The lever body is provided with aligned openings to receive a pivot pin 53 which passes through the points of a clevis 54, the latter being connected to a brake operating cable 55 or other suitable means to actuate the braking mechanism of the vehicle.

In the operation of the arrangement of our invention, with the parts shown in brake released position as illustrated in Figure 1, it is only necessary to grasp the grip portion 25, the tooth 31 of the pawl 30 overriding the teeth of the clutch surface 33 as the lever is swung to counter-clockwise position and the tooth 31 engaging the proper tooth in the clutching surface to hold the braking mechanism in set position. When it is desired to effect a release of the braking mechanism the operator places the index or other finger upon the face 50 of the finger trigger and depresses the same, pivoting the trigger around pin 40 which exerts a downward pull upon the rod 36, thus disengaging the clutch mechanism, in the embodiment showing this operation, withdrawing the pawl tooth 31 on pawl 30 from engagement with the clutching surface 33 after which the lever may be swung clockwise to brake releasing position.

It is apparent that within the scope of the invention, modifications and different arrangements may be made other than is herein disclosed, and the present disclosure is illustrative merely, the invention comprehending all variations thereof.

What we claim is:

1. In combination, mechanism control including a support having a serrated depending edge; a lever formed of sheet metal having its major body portion of U-shaped cross section and having side wall portions straddling said support and pivotally connected thereto, said lever terminating at its lower extremity in a closed hollow handle portion; a pawl pivoted to said lever and adapted for engagement with the serrated surface on said support to retain the lever in adjusted position, said pawl being provided with a circular opening having a restricted throat; an operating rod of rectangular cross section having at one end an integral circular portion fitting the circular opening in said pawl; a finger trigger formed of sheet metal into cup-like configuration and pivoted to said lever adjacent the closed handle portion thereof, said trigger having its side wall portions extending into the U-shaped configuration of said lever, said trigger having a slot in an upper wall thereof, the operating rod having a portion of reduced cross section projecting into the slot in the wall of said trigger; and spring means for urging said pawl member into engagement with the serrated surface on said support.

2. In combination, mechanism control including a support having a clutching surface; a lever formed of sheet metal having its major body portion of U-shaped cross section; said lever being pivotally connected to said support; said lever terminating at its lower extremity in a hollow handle portion; a pawl pivoted to said lever and adapted for engagement with the clutching surface on said support; said pawl having a restricted opening; an operating rod having at one end an integral portion fitting into the opening in said pawl; a finger trigger formed of sheet metal into cup-like configuration and pivoted to said lever adjacent the closed handle portion thereof, said trigger having side wall portions extending into the U-shaped configuration of said lever, said trigger having a slot in an upper wall thereof, the operating rod having a hook portion projecting through the slot in the wall of said trigger; and spring means for urging said pawl member into engagement with the clutching surface on said support.

3. In combination, mechanism control including a support having a serrated depending edge; a lever formed of sheet metal having its major body portion of U-shaped cross section and having side wall portions straddling said support and pivotally connected thereto, said lever terminating at its lower extremity in a closed hollow handle portion; a pawl pivoted to said lever and adapted for engagement with the serrated surface on said support to retain the lever in adjusted position, said pawl having an open circular slot therein; an operating rod of rectangular cross section having at one end an integral circular portion fitting the circular slot in said pawl, the surfaces of said pawl and rod at the point of connection lying in substantially parallel planes; a finger trigger formed of sheet metal into cuplike configuration and pivoted to said lever adjacent the closed handle portion thereof, said trigger having side wall portions extending into the U-shaped configuration of said lever, said trigger having a slot in an upper wall thereof, the operating rod having a portion of reduced cross section projecting into the slot in the wall of said trigger; and spring means for urging said pawl member into engagement with the serrated surface on said support.

4. In combination, mechanism control including a support having a clutching surface; a lever formed of sheet metal having its major body portion of U-shaped cross section; said lever being pivotally connected to said support, said lever terminating at its lower extremity in a hollow handle portion; a pawl pivoted to said lever and adapted for engagement with the clutching surface on said support; said pawl having a restricted opening; an operating rod having at one end an integral portion fitting into the opening in said pawl; a finger trigger formed of sheet metal into cup-like configuration and pivoted to said lever adjacent the closed handle portion thereof, said trigger having side wall portions extending into the U-shaped configuration of said lever; said trigger having a finger engaging portion formed of converging walls terminating in the side wall portions thereof, said trigger having a slot in an upper wall, the operating rod having a hood portion projecting through the slot in a wall of said trigger; and spring means for urging said pawl into engagement with the clutching surface on the support.

5. In combination, mechanism control including a support having a clutching surface; a lever formed of sheet metal having a portion pivotally connected to said support, said lever member having a hollow body portion terminating at its lower extremity in a handle portion; a clutch member carried by said lever member and adapted for engagement with the clutching surface on said support to retain the lever in adjusted position; a finger trigger formed of sheet metal of hollow configuration, said finger trigger being pivotally connected to said lever member, said finger trigger having a slot in a wall thereof; an operating bar having a hook portion engaging in said slot and connecting the finger trigger with the clutch member; and spring means associated with said finger trigger for maintaining said finger trigger in its outer position.

6. In combination, mechanism control including a support having a clutching surface upon a depending edge thereof; a lever formed of sheet metal having portions straddling said support and pivotally connected thereto, said lever having a hollow body portion terminating at its lower extremity in a handle portion; a pawl pivotally carried by said lever and adapted for engagement with the clutching surface on said support to retain the lever in adjusted position, said pawl having a circular recess therein; an operating rod of rectangular cross section having a disk-like circular portion engageable in the recess in said pawl; a finger trigger pivotally connected to said lever adjacent the handle portion, said operating rod being connected to said finger trigger; and spring means having portions engageable with said lever and said finger piece to normally maintain said finger piece in its outer position.

7. In combination, mechanism control including a support having a clutching surface upon a depending edge thereof; a lever formed of sheet metal having portions straddling said support and pivotally connected thereto, said lever having a hollow body portion terminating at its lower extremity in a handle portion; a pawl pivotally carried by said lever and adapted for engagement with the clutching surface on said support to retain the lever in adjusted position, said pawl having a circular recess therein; an operating rod having an integral flat circular portion fitting in the recess in said pawl; a finger trigger formed of sheet metal into cup-like configuration; a pin extending through said lever, said trigger having openings in the walls thereof through which said pin extends, said trigger being positioned in the hollow configuration of said handle portion; a connection between said finger trigger and said operating rod; spring means encircling said pin and having its end portions respectively engaging a wall of said handle portion and said finger trigger, said spring means arranged to normally maintain said finger trigger in its outer position.

CHARLES S. McCARTHY.
ARCHIBALD A. WARNER.